Patented Aug. 13, 1940

2,211,696

UNITED STATES PATENT OFFICE 2,211,696

TREATMENT OF WELLS

Carroll R. Irons, Midland, Mich., assignor to The Dow Chemical Company, Midland, Mich., a corporation of Michigan No Drawing. Application September 23, 1937, Serial No. 165,315

4 Claims. (Cl. 166—21)

The invention relates to methods of treating wells. It more particularly concerns a method of restoring the porosity of the walls of the bore of an oil, gas or other well, wherein the walls have been partially or wholly sealed or mudded off.

Sealing or mudding-off of a well bore may occur while the well is being drilled in conventional manner, wherein a clay mud drilling fluid is circulated in the bore to carry the cuttings away from the drill. The action of the drill and the pressure exerted by the circulating mud column forms a mud lining on the walls of the bore which prevents the flow of fluids into the well. In many cases during the drilling of oil or gas wells, minor producing zones are often drilled through and thus mudded off in attempting to discover a more productive stratum at a lower level. However, if in such attempts a more productive stratum is not encountered, it is usually desirable to plug back the well and attempt to obtain the production from the minor zones rather than to abandon the well. In the past it has been difficult to open such minor zones to production, due to the difficulty of removing the mud lining adhering to the formation face, and often such zones must be abandoned.

The removal of the mud lining is difficult and sometimes impossible, because the usual clay muds employed as drilling fluids are neither soluble in, nor amenable to disintegration by, any of the usual solvents available for cleaning out well bores. It is a desideratum in the art, therefore, to provide a method of readily removing from a well bore the mud lining deposited therein during drilling.

I have now discovered that by bringing into contact with the mud lining in the well bore a liquid of relatively low electrical conductivity and subjecting the liquid and the mud lining to the action of an electric current passed between an electrode immersed in the liquid and a ground connection near the well, whereby electro-endosmosis and electro-phoresis occur, the mud lining can be readily removed.

The occurrence of electro-endosmosis and electro-phoresis depends on the fact that when a liquid of low electrical conductivity is in contact with a solid the liquid and the solid acquire unlike electrical charges. If an electric current is then passed through the liquid between electrodes immersed therein, a pressure resulting from the potential applied tends to cause the liquid molecules to migrate. If, for example, the solid is in the form of suspended clay particles, the liquid molecules will migrate through the suspended clay particles and collect at the electrode having an electrical charge of opposite sign to that assumed by the liquid. This migration of the liquid molecules to one of the electrodes is electro-endosmosis. At the same time the suspended clay particles, due to the influence of the electric field, migrate to and collect at the other electrode. The movement of the suspended solid particles to one of the electrodes due to the influence of the electric field is electro-phoresis. The extent to which electro-phoresis can occur depends upon the nature of the solid in contact with the liquid. When the solid is strongly bonded or cemented together and is unaffected by the liquid in contact with it, as in the case of a porous clay diaphragm, electro-phoresis will not occur as any one particle can not move without the whole diaphragm moving. In this case the electro-endosmotic pressure developed causes the liquid to penetrate and flow through the pores and interstices of the diaphragm to one electrode without causing the solid particles to move. However under the condition wherein the solid in contact with the liquid is composed of particles that are not strongly attached or cemented to each other as in the case of a clay mud in the form of a mud lining on the wall of a well bore, the liquid under the influence of an electric field first penetrates into the mud lining, diluting it out and softening it. The softened and loosened mud particles free to move, in part migrate to and collect at the electrode in the well bore, while the remainder sloughs off into the bore and can be removed therefrom by bailing. By the foregoing method the usual mud lining can be easily removed from any portion of a well bore. The invention, then, consists of the method hereinafter fully described and particularly pointed out in the claims.

In carrying out the invention in a well to remove the mud lining, a liquid of suitable electrical conductivity is introduced into the well in an amount sufficient to fill the well to the top of the portion to be treated. Various liquids are suitable for use in carrying out the method, and may be of either an inorganic or an organic nature. The best results are obtained by employing liquids of relatively low electrical conductivity, as the amount of electro-phoresis and electro-endosmosis which occurs is inversely proportional to the electrical conductivity of the liquid. Weak or very dilute solutions of electrolytes are suitable for use, providing such electrolytes do not contain heavy metal ions which produce free metal on electrolysis, or ions capable of uniting with ions contained in the liquids present in the earth formations to form relatively insoluble compounds, because such solutions undergo electrolysis instead of electro-endosmosis. Representative liquids that are satisfactory are water, dilute salt solutions, acetone, nitrobenzene, methyl alcohol, ethyl alcohol, and turpentine. Other liquids may also be used, providing electro-endosmosis occurs when they are subjected to the action of electric current in the well bore. The suitability of a liquid for undergoing electro-endosmosis may be easily determined by the standard laboratory test for electro-endosmosis, wherein the liquid to be tested is placed in a vessel separated into two compartments by a porous clay diaphragm and subjected to the action of a suitable electric current. If electro-endosmosis readily occurs, the liquid may be used.

After the liquid is introduced into the well, an electrode is lowered into the well on an insulated conducting cable until it is opposite the formation to be treated and immersed in the liquid. A suitable ground connection is also provided. In general, the ground connections may be made through metal rods and the like, driven a few feet into the ground in the vicinity of the well, preferably in moist earth, and about half as far from the well head as the depth of the stratum to be treated. The electrode immersed in the liquid in the well may be made of iron or other suitable metal, and should be long enough to extend well into the liquid in the bore.

An electric current is then passed through the liquid from a source of current, the circuit being completed through the earth from the ground electrode to the electrode immersed in the liquid in the well. The voltage which should be applied to effect electro-endosmosis and electro-phoresis depends upon the conductivity of both the surrounding earth and the liquid employed, and the resistance of the ground connections. A sufficient potential is applied to produce a current in the order of about 10 to 100 amperes per sq. ft. of area of the face of the bore to be treated, although other current densities may be used. It has been found that a potential of 25 to 250 volts may be required, but these values are merely illustrative. As the current passes through the liquid, the liquid penetrates the mud lining, softening it and loosening it from the formation face. A portion of the loosened mud particles which do not slough off into the well bore migrate to and are deposited on the electrode in the bore.

The flow of a liquid undergoing electro-endosmosis is generally from the anode to the cathode, although it may take place in the opposite direction with certain liquids, and depends upon the charge assumed by the liquid in contact with the clay mud lining. For this reason, the direction in which the current is to be passed is chosen so that the liquid is caused to move into the mud lining of the well bore. The loosened mud particles then migrate to the electrode in the well bore. The current is allowed to flow until the mud lining is sufficiently disintegrated to be removed from the well by bailing. A portion of the disintegrated mud will deposit upon the electrode in the well. Upon satisfactorily completing the removal of the mud lining from the surface of the bore, the electrode, with the mud adhering thereto, is withdrawn from the well and the liquid and mud sloughings in the bore are removed, as by bailing, before putting the well into production.

Other modes of applying the principle of my invention may be employed instead of those explained, change being made as regards the method herein disclosed, provided the step or steps stated by any of the following claims or the equivalent of such stated step or steps be employed.

I therefore particularly point out and distinctly claim as my invention:

1. In a method of removing the mud lining from the walls of a well bore, the steps which comprise introducing into the well bore a non-aqueous liquid which will undergo electro-endosmosis without substantial electrolysis when subjected to a relatively high electric potential, and applying a potential sufficient to cause an electric current to pass between an electrode immersed in the liquid in the well bore and a ground connection whereby the liquid in the well bore is caused to migrate into the mud lining.

2. In a method of removing a mud lining from the walls of a well bore, the steps which comprise introducing into the well bore a quantity of acetone, applying a potential sufficient to cause an electric current to pass between an electrode immersed in the acetone in the well bore and a ground connection, whereby the acetone in the well bore is caused to migrate into the mud lining.

3. In a method of removing a mud lining from the walls of a well bore, the steps which comprise introducing into the well bore a quantity of an alcohol, applying a potential sufficient to cause an electric current to pass between an electrode immersed in the alcohol in the well bore and a ground connection, whereby the alcohol in the well bore is caused to migrate into the mud lining.

4. In a method of removing a mud lining from the walls of a well bore, the steps which comprise introducting into the well bore a quantity of nitrobenzene, applying a potential sufficient to cause an electric current to pass between an electrode immersed in the nitrobenzene in the well bore and a ground connection, whereby the nitrobenzene in the well bore is caused to migrate into the mud lining.

CARROLL R. IRONS.